US012784943B2

(12) United States Patent
Chen et al.

(10) Patent No.: US 12,784,943 B2
(45) Date of Patent: Nov. 3, 2026

(54) CIRCUIT PROTECTION DEVICE

(71) Applicant: FUZETEC TECHNOLOGY CO., LTD., New Taipei City (TW)

(72) Inventors: Jack Jih-Sang Chen, New Taipei City (TW); Chang-Hung Jiang, New Taipei City (TW)

(73) Assignee: FUZETEC TECHNOLOGY CO., LTD., New Taipei City (TW)

( * ) Notice: Subject to any disclaimer, the term of this patent is extended or adjusted under 35 U.S.C. 154(b) by 168 days.

(21) Appl. No.: 18/819,883

(22) Filed: Aug. 29, 2024

(65) Prior Publication Data

US 2026/0066156 A1 Mar. 5, 2026

(51) Int. Cl.
*H01C 7/02* (2006.01)
*H01C 1/14* (2006.01)

(52) U.S. Cl.
CPC ........... *H01C 7/028* (2013.01); *H01C 1/1406* (2013.01); *H01C 7/021* (2013.01)

(58) Field of Classification Search
CPC ...... H01C 7/028; H01C 1/1406; H01C 7/021; H01C 7/02; H01C 7/027
USPC .......................................................... 361/103
See application file for complete search history.

(56) References Cited

U.S. PATENT DOCUMENTS

2002/0130757 A1* 9/2002 Huang .................. H01C 1/148
338/22 R
2013/0196182 A1* 8/2013 Tanaka ................ H01M 50/574
429/7
2021/0305807 A1* 9/2021 Chen .................... H01C 1/1406

* cited by examiner

*Primary Examiner* — Sreeya Sreevatsa
(74) *Attorney, Agent, or Firm* — HSML P.C.

(57) ABSTRACT

A circuit protection device includes a positive temperature coefficient (PTC) component, an insulating unit, and a device electrode unit. The PTC component includes a PTC layer, a first PTC electrode, and a second PTC electrode. The PTC layer has two side walls that are opposite to each other. The insulating unit is disposed on the PTC component. The device electrode unit is formed on the insulating unit and includes a first device electrode and a second device electrode. The first device electrode is electrically connected to the first PTC electrode and is spaced apart from one of the side walls of the PTC layer. The second device electrode is electrically connected to the second PTC electrode.

15 Claims, 6 Drawing Sheets

CIRCUIT PROTECTION DEVICE

FIELD

The disclosure relates to a circuit protection device, and more particularly to a positive temperature coefficient circuit protection device.

BACKGROUND

Positive temperature coefficient (PTC) components exhibit a PTC effect which could be used to create a circuit protection device such as a resettable fuse. Such a PTC component may include a PTC polymeric unit and first and second electrodes on two opposite surfaces of the PTC polymeric unit. The PTC polymeric unit includes a polymer matrix that contains a crystalline region and a non-crystalline region, and a particulate conductive filler that is dispersed in the non-crystalline region of the polymer matrix and that is formed into conductive pathways for electrical conduction between the first and second electrodes. The PTC effect is a phenomenon that occurs when the temperature of the polymer matrix is raised to its melting point, in which crystals in the crystalline region start to melt. This will result in the generation of a new non-crystalline region. As the new non-crystalline region expands to merge with the original non-crystalline region, the conductive pathways of the particulate conductive filler will gradually be cut-off, and the resistance of the PTC polymer material will sharply increase. This will eventually result in the first and second electrodes becoming electrically disconnected from each other.

Referring to FIG. 1, a conventional surface-mounted PTC circuit protection device 1 includes a PTC unit 14, a first insulation layer 15, a second insulation layer 16, a first electrode 17, and a second electrode 18. The PTC unit 14 includes a first electrically conductive member 12, a second electrically conductive member 13 and a polymeric layer 11 laminated between the first and second electrically conductive members 12, 13. The polymeric layer 11 exhibits PTC behavior and includes a polymer matric and a particulate conductive filler dispersed in the polymer matrix. The first insulation layer 15 is disposed on the first electrically conductive member 12, whereas the second insulation layer 16 is disposed on the second electrically conductive member 13. The first electrode 17 is electrically coupled to the first electrically conductive member 12, and is disposed on the first insulating layer 15 and further extends towards the second insulation layer 16. Likewise, the second electrode 18 is electrically coupled to the second electrically conductive member 13, and is disposed on the second insulation layer 16 and further extends toward the first insulation layer 15.

A circuit protection device is a fail-safe that is designed to protect people and equipment if an electrical fault occurs. Thus, superior stability and performance improvements for circuit protection devices are pursued by many in related industries.

SUMMARY

Therefore, an object of the disclosure is to provide a circuit protection device that can alleviate at least one of the drawbacks of the prior art.

According to the disclosure, the circuit protection device includes a positive temperature coefficient (PTC) component, an insulating unit, and a device electrode unit. The PTC component includes a PTC layer, a first PTC electrode, and a second PTC electrode. The PTC layer has an upper surface, a lower surface, and two side walls that are opposite to each other and that interconnect the upper surface and the lower surface. The first PTC electrode is formed on the upper surface of the PTC layer. The second PTC electrode is formed on the lower surface of the PTC layer. The insulating unit is disposed on the PTC component. The device electrode unit is formed on the insulating unit and includes a first device electrode and a second device electrode. The first device electrode is electrically connected to the first PTC electrode and is spaced apart from the one of the side walls of the PTC layer. The second device electrode is electrically connected to the second PTC electrode.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
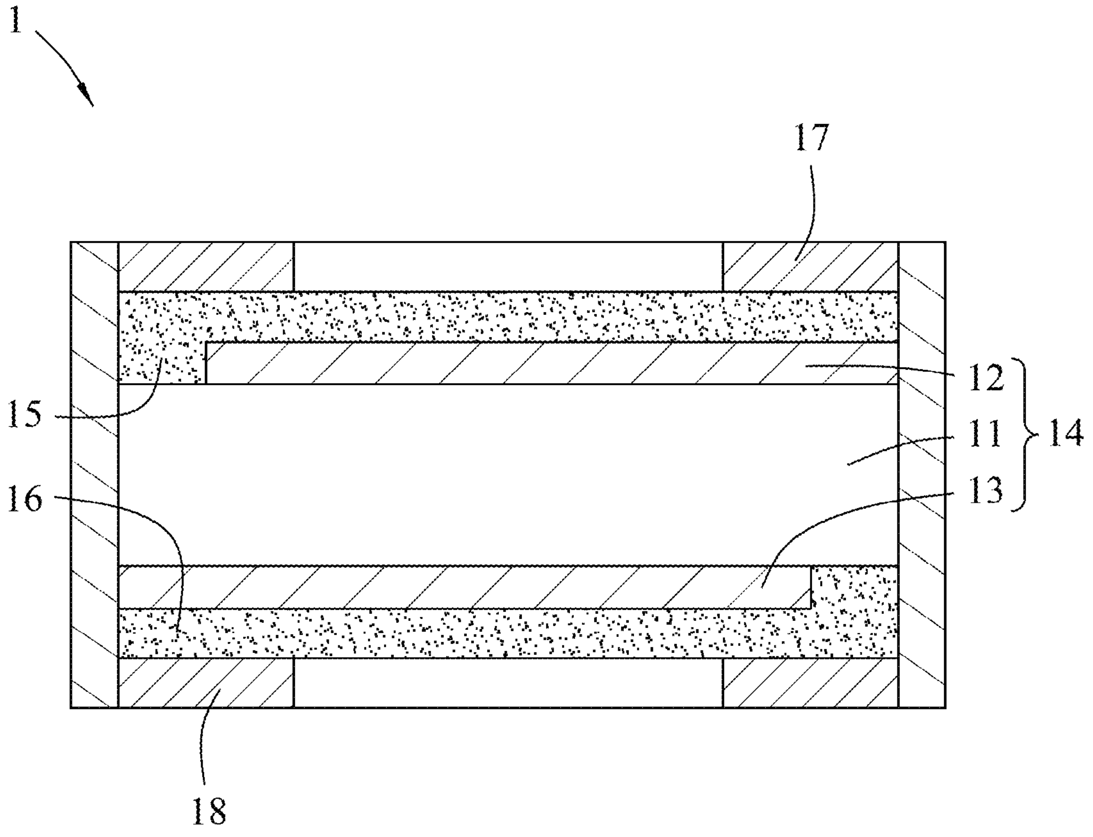
FIG. 1 PRIOR ART
FIG. 1 is schematic cross-sectional view illustrating a conventional surface-mounted PTC circuit protection device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
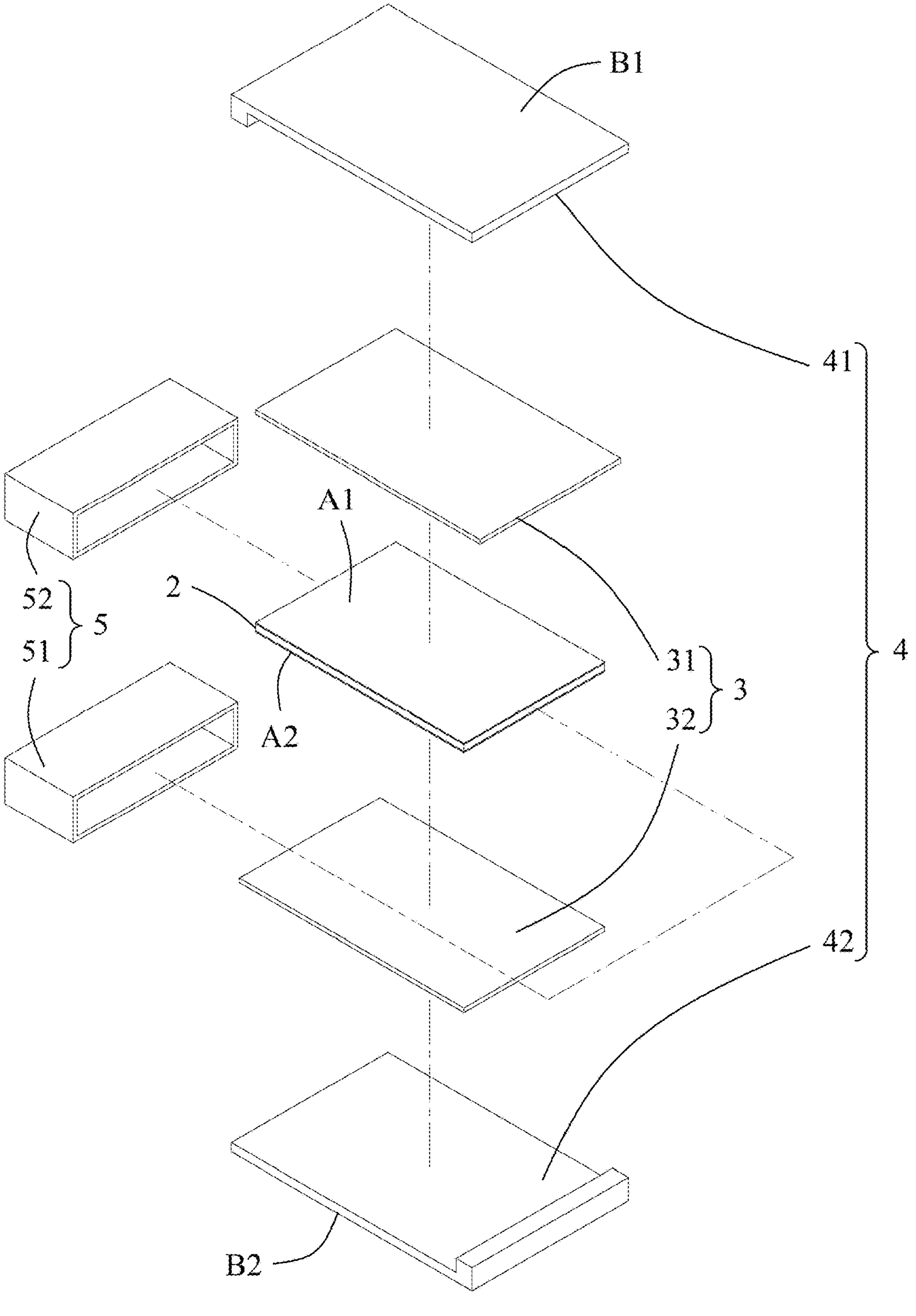
FIG. 2 is an exploded schematic view illustrating an embodiment of a circuit protection device according to the present disclosure.
Figure 3:
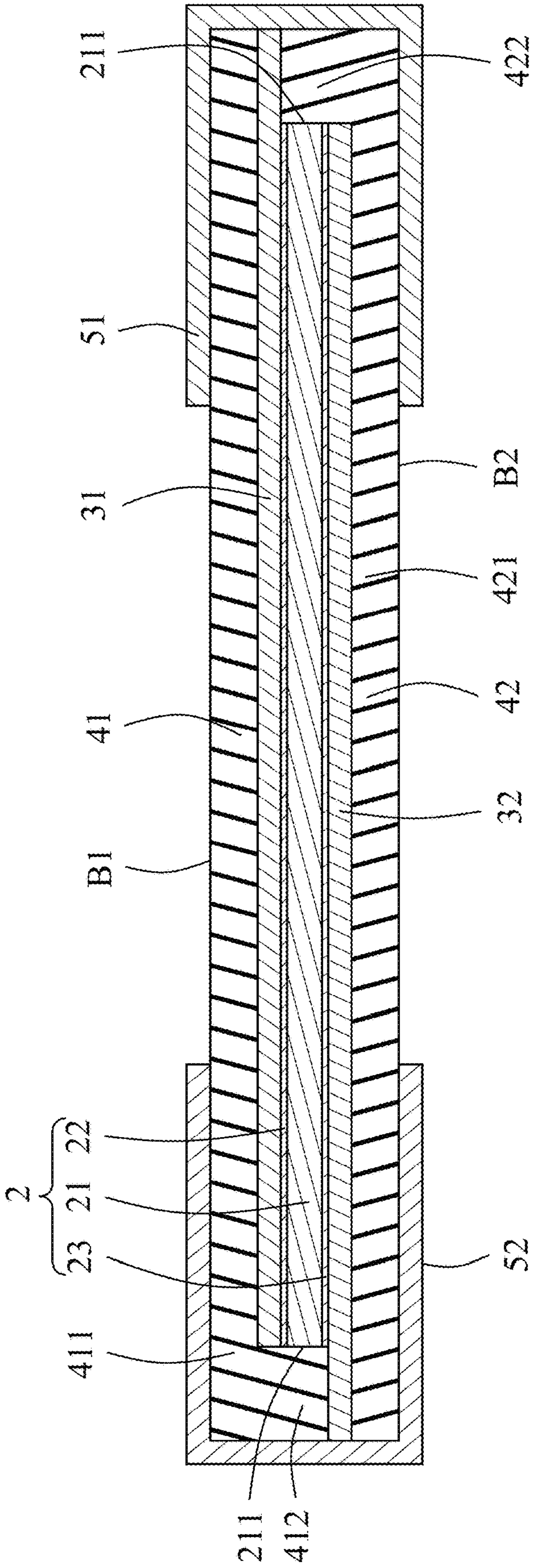
FIG. 3 is a schematic cross-sectional view illustrating the embodiment.

Referring to FIGS. 2 and 3, a first embodiment of the circuit protection device according to the present disclosure includes a positive temperature coefficient (PTC) component 2, a first electrically conductive member 31, a second electrically conductive member 32, an insulating unit 4, and a device electrode unit 5 which is formed on the insulating unit 4 and includes a first device electrode 51 and a second device electrode 52.

The PTC component 2 includes a PTC layer 21, a first PTC electrode 22, and a second PTC electrode 23. The PTC layer 21 has an upper surface, a lower surface, and two side walls 211 that are opposite to each other and that interconnect the upper surface and the lower surface. In this embodiment, the first device electrode 51 is spaced apart from one of the side walls 211 of the PTC layer 21 and electrically connected to the first PTC electrode 22, and the second device electrode 52 is spaced apart from another one of the side walls 211 of the PTC layer 21 and electrically connected to the second PTC electrode 23. However, in other embodiments, only one of the first and second device electrodes 51, 52 may be spaced apart from a respective one of the two side walls 211 of the PTC layer 21.

The PTC layer 21 of the PTC component includes a polymer matrix and a particulate conductive filler dispersed in the polymer matrix. The polymer matrix may be made from a PTC composition that contains a non-grafted olefin-based polymer (e.g., high density polyethylene, HDPE). In certain embodiments, the PTC composition of the polymer matrix further includes a grafted olefin-based polymer. In certain embodiments, the grafted olefin-based polymer includes carboxylic acid anhydride-grafted olefin-based polymer. The carboxylic acid anhydride-grafted olefin-based polymer may be carboxylic acid anhydride-grafted high density polyethylene. In this embodiment, the particulate conductive filler may be made from carbon black, metal powders, or conductive ceramic powders.

Examples of the particulate conductive filler include titanium carbide, zirconium carbide, vanadium carbide, molybdenum carbide, tungsten carbide, titanium nitride, zirconium nitride, vanadium nitride, niobium nitride, tantalum nitride, chromium nitride, titanium disilicide, niobium disilicide, gold, silver, copper, aluminum, nickel, nickel-metallized glass beads, nickel-metallized graphite, Ti—Ta solid solution, W—Ti—Ta—Nb solid solution, W—Ti—Ta solid solution, W—Ti solid solution, Ta—Nb solid solution, and combinations thereof.

In some embodiments, the polymer matrix may be present in an amount ranging from 5 wt % to 50 wt % based on the weight of the PTC layer 21, and the particulate conductive filler may be present in an amount ranging from 50 wt % to 95 wt % based on the weight of the PTC layer 21.

Each of the first and second PTC electrodes 22, 23 may be made from a conductive material, e.g., metal. The first PTC electrode 22 is disposed on the upper surface of the PTC layer 21 and has a first electrode surface (A1). The second PTC electrode 23 is disposed on the lower surface of the PTC layer 21 and has a second electrode surface (A2).

The first electrically conductive member 31 may be made of a conductive material, e.g., metal, is electrically connected to the first PTC electrode 22, and disposed on the first PTC electrode 22 opposite to the PTC layer 21. The second electrically conductive member 32 may be made of a conductive material, e.g., metal, is electrically connected to the second PTC electrode 23, and disposed on the second PTC electrode 23 opposite to the PTC layer 21. More specifically, the first electrically conductive member 31 is disposed on the first electrode surface (A1) of the first PTC electrode 22, and the second electrically conductive member 32 is disposed on the second electrode surface (A2) of the second PTC electrode 23.

Figure 4:
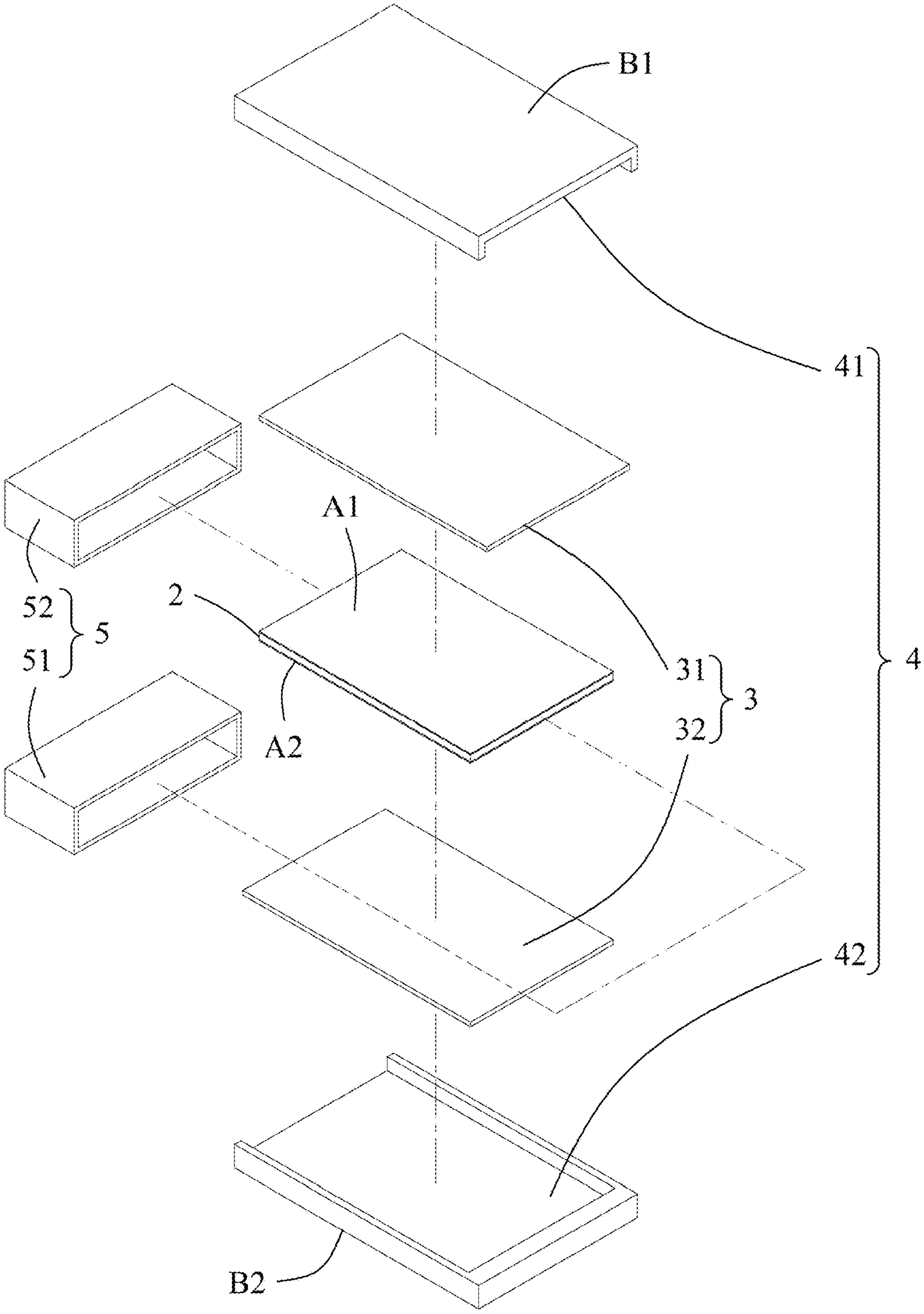
FIG. 4 is exploded schematic view illustrating a variation of the embodiment.

Referring to FIG. 3, in this embodiment, the insulating unit 4 is disposed on the PTC component 2 and covers both of the side walls 211 of the PTC layer 21 so that the insulating unit 4 is disposed between the side walls 211 of the PTC component 2 and the device electrode unit 5. However, in other embodiments, the insulating unit 4 may only cover one of the side walls 211 of the PTC layer 21. Referring to FIG. 4, alternatively, the insulating unit 4 may envelope the PTC component 2. That is, the PTC component 2 is completely enclosed by the insulating unit 4 so that the PTC component 2 is spaced apart from the first device electrode 51 and the second device electrode by the insulating unit 4. In this embodiment, the first electrically conductive member 31 electrically interconnects the first PTC electrode 22 and the first device electrode 51, and the second electrically conductive member 32 electrically interconnects the second PTC electrode 23 and the second device electrode 52.

In this embodiment, the first device electrode 51 is spaced apart from the one of the side walls 211 of the PTC layer 21 by the insulating unit 4, and the second device electrode 52 is spaced apart from the another one of the side walls by the insulating unit 4. More specifically, in this embodiment, the insulating unit 4 includes a first insulating layer 41 and a second insulating layer 42. The first device electrode 51 is spaced apart from the one of the side walls 211 by the second insulating layer 42, and the second device electrode 52 is spaced apart from the another one of the side walls 211 by the first insulating layer 41.

In this embodiment, the first electrode surface (A1) of the first PTC electrode 22 faces the first insulating layer 41, and the second electrode surface (A2) of the second PTC electrode 23 faces the second insulating layer 42. The first insulating layer 41 has a first body portion 411 having a first outward facing surface (B1) that faces away from the PTC component 2, and covering the PTC layer 21, the first PTC electrode 22 and the first electrically conductive member 31, and a first extending portion 412 connected to and extending from the first body portion 411 toward the second insulating layer 42 to cover the another one of the side walls 211 of the PTC layer 21. The second insulating layer 42 has a second body portion 421 having a second outward facing surface (B2) that faces away from the PTC component 2, and covering the PTC layer 21, the second PTC electrode 23 and the second electrically conductive member 32, and a second extending portion 422 connected to and extending from the second body portion 421 toward the first insulating layer 41 to cover the one of the side walls 211 of the PTC layer 21. The first electrically conductive member 31 extends outwardly from the first electrode surface (A1) to contact the first device electrode 51, and the second electrically conductive member 32 extends outwardly from the second electrode surface (A2) to contact the second device electrode 52.

In this embodiment, the first device electrode 51 is disposed on a part of the first outward facing surface (B1) and extends over and contacts an end of the first electrically conductive member 31, the second extending portion 422 and a part of the second outward facing surface (B2). The second device electrode 52 is disposed on a part of the second outward facing surface (B2) and extends over and contacts an end of the second electrically conductive member 32, the first extending portion 412 and a part of the first outward facing surface (B1).

In this embodiment, the one of the side walls 211 of the PTC layer 21 abuts against the second insulating layer 42 of the insulating unit 4, and the another one of the side walls 211 of the PTC layer 21 abuts against the first insulating layer 41 of the insulating unit 4.

In some embodiments, the PTC component 2 has a maximum dimension that is 0.1 mm.

In some embodiments, an area of the first electrode surface (A1) is smaller than an area of the first outward facing surface (B1), and an area of the second electrode surface (A2) is smaller than an area of the second outward facing surface (B2).

Referring to FIG. 2, in some embodiments, a projection of the PTC layer 21 of the PTC component 2 on an imaginary plane parallel to the upper surface of the PTC layer 21 is within a projection of the insulating unit 4 on the imaginary plane.

In some embodiments, the area of the first electrode surface (A1) is 50% to 95% of the area of the first outward facing surface (B1), and the area of the second electrode surface (A2) is 50% to 95% of the area of the second outward facing surface (B2).

In other embodiments, the area of the first electrode surface (A1) is 87% to 94% of the area of the first outward facing surface (B1), and the area of the second electrode surface (A2) is 87% to 94% of the area of the second outward facing surface (B2).

Figure 5:
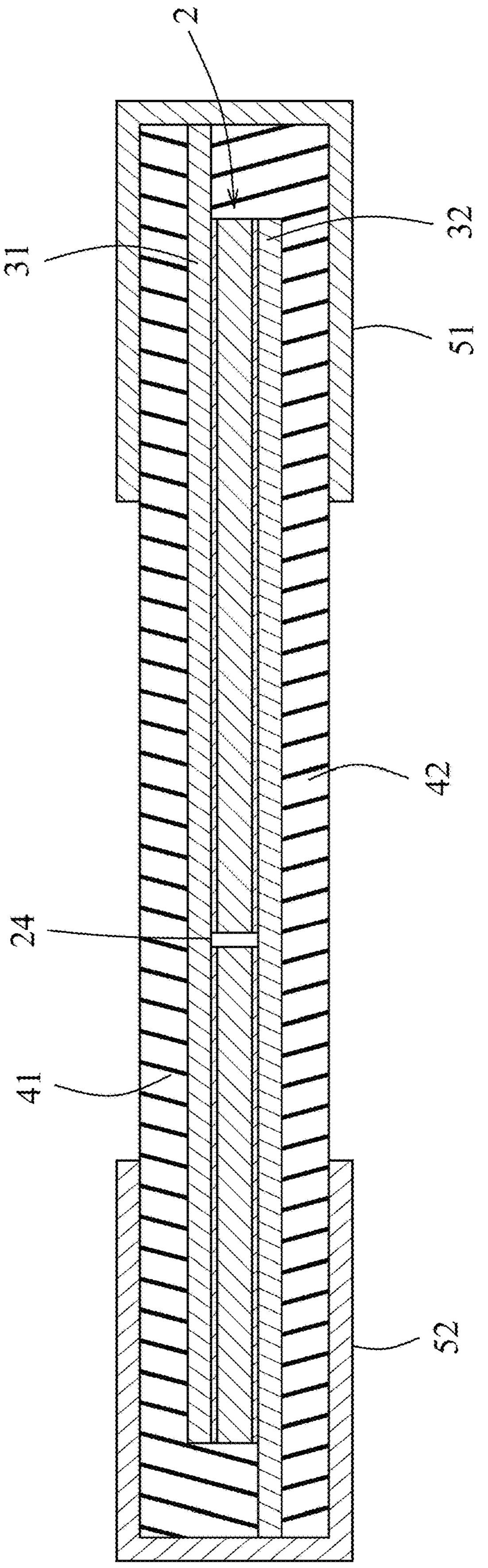
FIG. 5 is a schematic cross-sectional view illustrating another embodiment of the circuit protection device.

Referring to FIG. 5, in another embodiment, the PTC component 2 includes at least one aperture 24 which extends through the PTC layer 21 and at least one of the upper surface and the lower surface of the PTC layer 21. In other embodiments, the at least one aperture 24 may further extends through at least one of the first PTC electrode 22 and the second PTC electrode 23 of the PTC component 2. In other embodiments, the PTC component 2 may include two or more apertures 24. It should be noted that the present disclosure is not limited to the disclosed number of apertures 24.

Examples and comparative examples of the disclosure will be described hereinafter. It is understood that these examples and comparative examples are exemplary, and explanatory and should not be construed as a limitation to the disclosure.

Example 1 (E1)

First, 10.25 grams of high density polyethylene (HDPE) (purchased from Formosa Plastics® Corp., catalog no.: HDPE 9002) serving as the non-grafted olefin-based polymer, 10.25 grams of maleic anhydride-grafted HDPE (purchased from DuPont™ de Nemours, Inc., catalog no.: MB100D) serving as the carboxylic acid anhydride-grafted olefin-based polymer, and 29.5 grams of carbon black powder (purchased from Columbian Chemicals Company catalog no.: Raven® 430 UB) serving as the particulate conductive filler were compounded in a Brabender mixer so as to obtain a compounded mixture. The compounding temperature was 200° C., the stirring rate of the mixer was 30 rpm, and the compounding time was 10 minutes. The compounded mixture was placed in a mold and was hot pressed at 200° C. under a pressure of 80 kg/cm$^2$ for 4 minutes to form a PTC layer with a thickness of 0.35 mm.

Next, the PTC layer was removed from the mold, and then, sandwiched between two copper foil sheets (serving as the first PTC electrode 22 and the second PTC electrode 23), followed by hot pressing at 200° C. under a pressure of 80 kg/cm$^2$ for 4 minutes to form a PTC component block with a thickness of 0.42 mm.

Next, the PTC component block was then cut to form multiple semi-finished components, each having a size of 5.0 mm×7.2 mm. Each of the semi-finished components were then irradiated by a cobalt-60 gamma ray for a total radiation dose of 150 kGy.

Next, copper sheets (serving as the first electrically conductive member 31 and the second electrically conductive member 32) were formed on the copper foil film sheets of each of the semi-finished components.

Next, each of the semi-finished components along with the first electrically conductive member 31 and the second electrically conductive member 32 were then sandwiched between two epoxy glass fiber layers (serving as the first insulating layer 41 and the second insulating layer 42 of an insulating unit 4), followed by hot pressing for 40 minutes at 150° C. under 80 kg/cm$^3$ of pressure to form semi-products with a size of 5.2 mm×7.4 mm.

Next, a first device electrode 51 and a second device electrode 52 were electroplated on each of the semi-products to form a circuit protection device as shown in FIG. 2. Selected characteristics of the circuit protection device of E1 are shown in Table 1.

Example 2 (E2)

The circuit protection devices from E2 were similar to that of E1. However, each of the semi-finished components from E2 had a size of 4.8 mm×7.0 mm. Selected characteristics of the circuit protection device of E2 are shown in Table 1.

Example 3 and Example 4 (E3 & E4)

The circuit protection devices from E3 and E4 were similar to that of E1 and E2. More specifically, the circuit protection device of E3 has the same dimensions as the circuit protection device of E1, and the circuit protection device of E4 has the same dimensions as the circuit protection device of E2. However, the circuit protections devices from E3 and E4 each included at least one aperture 24. The structure of each of the circuit protection device of E3 or E4 is shown in FIG. 5. Selected characteristics of the circuit protection devices of E3 and E4 are shown in Table 1.

Comparative Example 1 (CE1)

First, 10.25 grams of high density polyethylene (HDPE) (purchased from Formosa Plastics® Corp., catalog no.: HDPE 9002) serving as the non-grafted olefin-based polymer, 10.25 grams of maleic anhydride-grafted HDPE (purchased from DuPont™ de Nemours, Inc., catalog no.: MB100D) serving as the carboxylic acid anhydride-grafted olefin-based polymer, and 29.5 grams of carbon black powder (purchased from Columbian Chemicals Company catalog no.: Raven® 430 UB) serving as the particulate conductive filler were compounded in a Brabender mixer so as to obtain a compounded mixture. The compounding temperature was 200° C., the stirring rate of the mixer was 30 rpm, and the compounding time was 10 minutes. The compounded mixture was placed in a mold and was hot pressed at 200° C. under a pressure of 80 kg/cm$^2$ for 4 minutes to form a PTC layer 210 with a thickness of 0.35 mm.

Figure 6:
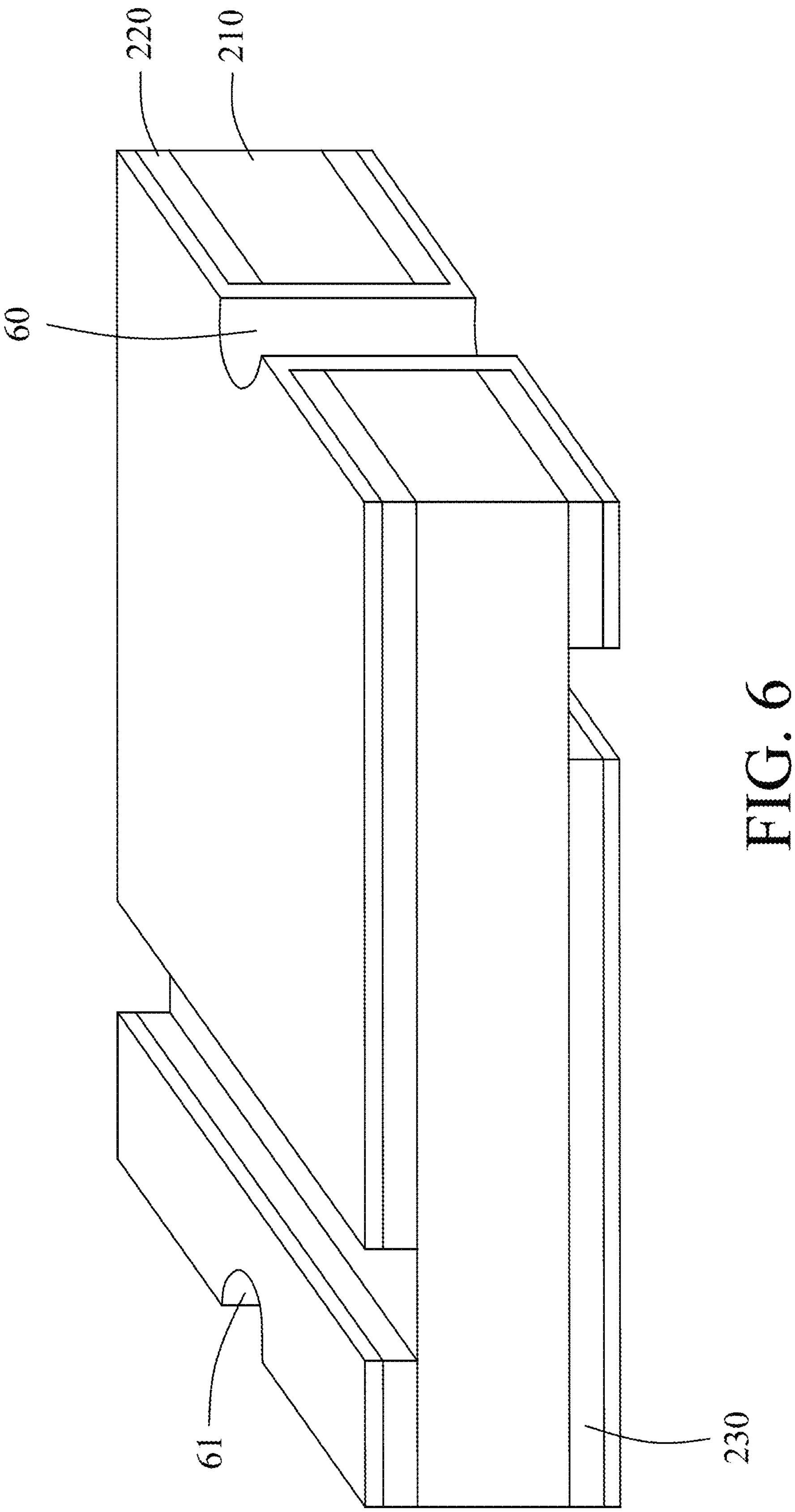
FIG. 6 is a schematic view illustrating a conventional circuit protection device of a first comparative example.

Next, the PTC layer was removed from the mold, and then, sandwiched between two copper foil sheets, followed by patterning the two copper foil sheets so as to form two PTC electrodes 220, 230 on the PTC layer (see FIG. 6). The PTC layer along with the patterned copper foil sheets was hot pressed at 200° C. under a pressure of 80 kg/cm$^2$ for 4 minutes to form a PTC component block with a thickness of 0.42 mm.

Next, the PTC component block was then cut to form multiple semi-finished components, each had a size of 5.2 mm×7.4 mm. Each of the semi-finished components were then irradiated by a cobalt-60 gamma ray for a total radiation dose of 150 kGy.

After being irradiated, each of the semi-finished components were drilled, electroplated and patterned to form a first device electrode 60 and a second device electrode 61, after which, a conventional circuit protection device of CE1 shown in FIG. 6 was obtained. Selected characteristics of the circuit protection device of CE1 are shown in Table 1.

Comparative Example 2 (CE2)

The circuit protection devices of CE2 were similar to that of CE1, except that each circuit protection device of CE2 included at least one aperture formed in the PTC layer and extending through the copper foil sheets. Selected characteristics of the circuit protection device of CE2 are shown in Table 1.

TABLE 1

| Example | Structure FIGS. | PTC layer, size, mm | Aperture |
|---|---|---|---|
| E1 | 2 | 5.0 × 7.2 | |
| E2 | 2 | 4.8 × 7.0 | |
| E3 | 4 | 5.0 × 7.2 | V |
| E4 | 4 | 4.8 × 7.0 | V |
| CE1 | 5 | 5.2 × 7.4 | |
| CE2 | 5 | 5.2 × 7.4 | V |

Performance Tests
Resistance Test 10 samples from each of E1 to E4 and CE1, CE2 were used to conduct the resistance test. An Ohmmeter was used to measure the resistance of each of the samples. An average resistance value was obtained from the resistance test for each of the examples and the comparative examples and are shown in Table 2.

Breakdown Voltage Test 10 samples from each of E1 to E4 and CE1, CE2 were used to conduct the breakdown voltage test under 8 A of current for 1 min. The average breakdown voltage for the samples of each of E1 to E4 and the CE1, CE2 are shown in Table 2.

Switching Cycle Test

A switching cycle test was performed on 10 samples of each of E1 to E4 and CE1 and CE2. The switching cycle test was conducted under a voltage of 16 Vdc and a current of 10 A by switching each test sample on for 60 seconds and then off for 60 seconds per cycle for 6000 cycles. The resistances of each test sample before (Ri) and right after (Rf) 6000 cycles were measured. A percentage of average resistance change (Rf/Ri×100%) are calculated and shown in Table 2. From Table 2, it is apparent that the percentage of average resistance change (Rf/Ri×100%) in E1 to E4 (ranging from 1746% to 2241%) is much lower than that in CE1 and CE2 (4991% and 4573%, respectively), and the circuit protection devices of E3 and E4 has relatively low percentage of average resistance change as compared to those of E1 and E2. The results show that separation of the PTC layer 21 from the first and second device electrodes may provide better insulation for the circuit protection devices and may alleviate influence of external environments on the circuit protection devices of E1 to E4, thereby enhancing stability and durability of the circuit protection device according to this disclosure.

Aging Test

An aging test was conducted on 10 samples of each of E1 to E4 and CE1 and CE2, where a current of 10 A and 16 Vdc was applied to each sample for 1000 hours. For each of the samples, an initial resistance (Ri) was taken before the current and voltage was applied, and a final resistance (Rf) was taken after 1000 hours of applying the current and voltage. The value for the final resistance (Rf) shown in Table 2 is an average value of the 10 samples of each of E1 to E4 and CE1 and CE2. A percentage of average resistance change (Rf/Ri×100%) in each of E1 to E4 and CE1 and CE2 is shown in Table 2. From Table 2, it is noted that the percentage of average resistance change (Rf/Ri×100%) in E1 to E4 (ranging from 183% to 348%) is lower than that of CE1 and CE2 (774% and 700%, respectively), and the circuit protection devices of E3 and E4 has relatively low percentage of average resistance change as compared to those of E1 and E2. The results demonstrate that the separation of the PTC layer 21 from the first and second device electrodes 51, 52 may alleviate influence of the external environment on the circuit protection devices of E1 to E4, thereby enhancing stability and durability of the circuit protection device according to this disclosure.

TABLE 2

| | Electrical property | | | | | | Environmental test | |
|---|---|---|---|---|---|---|---|---|
| | Break-down | | 16Vdc/10A, 6000 cycles test | | 16Vdc/10A, 1000 hours test | | 85° C. and 85 RH %, 1000 hours test | |
| Exam. | Voltage Vdc (V) | Resistance Ri (Ω) | Rf (Ω) | Rf/Ri % | Rf (Ω) | Rf/Ri % | Rf(Ω) | Rf/Ri % |
| E1 | 24 | 0.056 | 1.255 | 2241% | 0.195 | 348% | 0.057 | 102% |
| E2 | 26 | 0.058 | 1.150 | 1983% | 0.145 | 250% | 0.058 | 100% |
| E3 | 28 | 0.061 | 1.125 | 1844% | 0.125 | 205% | 0.060 | 98% |
| E4 | 30 | 0.063 | 1.100 | 1746% | 0.115 | 183% | 0.060 | 95% |
| CE1 | 18 | 0.053 | 2.645 | 4991% | 0.410 | 774% | 0.060 | 113% |
| CE2 | 20 | 0.055 | 2.515 | 4572% | 0.385 | 700% | 0.065 | 118% |

Referring to Table 2, the breakdown voltage in E1 to E4 ranges from 24 V to 30 V which is far higher than the breakdown voltage in CE1 and CE2 which ranges from 18 V to 20 V. The breakdown voltage test shows that the circuit protection devices of E1 to E4 has a higher breakdown voltage than the circuit protection devices of CE1 and CE2. This improvement is attributed to the PTC layer being separated from the first and second device electrodes. Moreover, it also reveals that the circuit protection devices of E3 and E4 formed with the aperture exhibit higher breakdown voltage than that of the circuit protection devices of E1 and E2.

Performance Test Under 85° C. And 85 RH %

10 samples from each of E1 to E4 and CE1 and CE2 were tested under a temperature of 85° C. and under a relative humidify of 85% for 1000 hours to determine the resistance change thereof. For each of the samples, an initial resistance (Ri) before the test and a final resistance (Rf) after the test were taken to determine the percentage of average resistance change (Rf/Ri×100%) of the samples of each of E1 to E4 and CE1 and CE2. The results are shown in Table 2. From Table 2, it is apparent that the samples of E1 to E4 have lower percentage of average resistance change (ranging from 95% to 102%) compared to that of the samples of CE1 and CE2 (113% and 118%, respectively), and the samples of E3 and E4 have lower percentage of average resistance change compared to that of the samples of E1 and E2. The results indicate that the circuit protection devices of E1 to E4 have superior stability and durability.

In summary of the above, compared to the surface-mounted PTC circuit protection device in which the polymeric layer 11 is in contact with the first and second electrodes 17, 18, the circuit protection device according to the present disclosure can better handle abnormal voltage and current flow and is more suitable for application under various environmental conditions due to the separation PTC layer 21 of the from first and second the device electrodes 51, 52 which may alleviate influence of the external environment on the circuit protection device, thereby enhancing its stability and durability.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A circuit protection device comprising:

a positive temperature coefficient (PTC) component including a PTC layer that has an upper surface, a lower surface, and two side walls that are opposite to each other and that interconnect said upper surface and said lower surface, a first PTC electrode formed on said upper surface of said PTC layer, and a second PTC electrode formed on said lower surface of said PTC layer;

an insulating unit disposed on said PTC component; and a device electrode unit formed on said insulating unit and including a first device electrode which is electrically connected to said first PTC electrode and which is spaced apart from one of said two side walls of said PTC layer, and a second device electrode which is electrically connected to said second PTC electrode, wherein said insulating unit includes a first insulating layer and a second insulating layer;

wherein said first device electrode is spaced apart from said one of said two side walls by said second insulating layer;

wherein said second device electrode is spaced apart from another one of said two side walls by said first insulating layer; and wherein said first insulating layer has a first body portion covering said first PTC electrode, and a first extending portion connected to and extending from said first body portion toward said second insulating layer to cover said another one of said two side walls of said PTC layer.

2. The circuit protection device as claimed in claim 1, wherein said second insulating layer has a second body portion covering said second PTC electrode, and a second extending portion connected to and extending from said second body portion toward said first insulating layer to cover said another one of said two side walls of said PTC layer.

3. The circuit protection device as claimed in claim 2, wherein said first body portion of said first insulating layer has a first outward facing surface facing away from said PTC component, said second body portion of said second insulating layer has a second outward facing surface facing away from the PTC component;

said first PTC electrode has a first electrode surface facing said first insulating layer, said second PTC electrode having a second electrode surface facing said second insulating layer; and an area of said first electrode surface is smaller than an area of said first outward facing surface, and an area of said second electrode surface is smaller than an area of said second outward facing surface.

4. The circuit protection device as claimed in claim 3, wherein:

said area of said first electrode surface is 50% to 95% of said area of said first outward facing surface; and said area of said second electrode surface is 50% to 95% of said area of said second outward facing surface.

5. The circuit protection device as claimed in claim 4, wherein:

said area of said first electrode surface is 87% to 94% of said area of said first outward facing surface; and said area of said second electrode surface is 87% to 94% of said area of said second outward facing surface.

6. The circuit protection device as claimed in claim 1, wherein a projection of said PTC layer of said PTC component on an imaginary plane parallel to said upper surface of said PTC layer is within a projection of said insulating unit on the imaginary plane.

7. The circuit protection device as claimed in claim 1, further comprising a first electrically conductive member which is disposed on a first electrode surface of said first PTC electrode and which electrically interconnects said first PTC electrode and said first device electrode, and a second electrically conductive member which is disposed on a second electrode surface of said second PTC electrode and which electrically interconnects said second PTC electrode and said second device electrode.

8. The circuit protection device as claimed in claim 1, wherein said insulating unit envelops said PTC component so that said PTC component is spaced apart from said first device electrode and said second device electrode by said insulating unit.

9. The circuit protection device as claimed in claim 1, wherein said PTC component includes at least one aperture.

10. The circuit protection device of claim 9, wherein said at least one aperture extends through at least one of said upper surface and said lower surface of said PTC layer.

11. The circuit protection device of claim 10, wherein said at least one aperture further extends through at least one of said first PTC electrode and said second PTC electrode of said PTC component.

12. The circuit protection device as claimed in claim 1, wherein said PTC layer of said PTC component includes a polymer matrix and a particulate conductive filler dispersed in said polymer matrix, said polymer matrix including a non-grafted olefin-based polymer.

13. The circuit protection device of claim 12, wherein said polymer matrix further includes a carboxylic acid anhydride-grafted olefin-based polymer.

14. The circuit protection device of claim 12, wherein said non-grafted olefin-based polymer is high density polyethylene.

15. The circuit protection device of claim 12, wherein said conductive filler is selected from the group consisting of carbon black, metal powders, and conductive ceramic powders.

* * * * *